May 25, 1926.
J. W. HAWN
1,585,855
PEDAL CONTROL MECHANISM
Filed Dec. 18, 1925
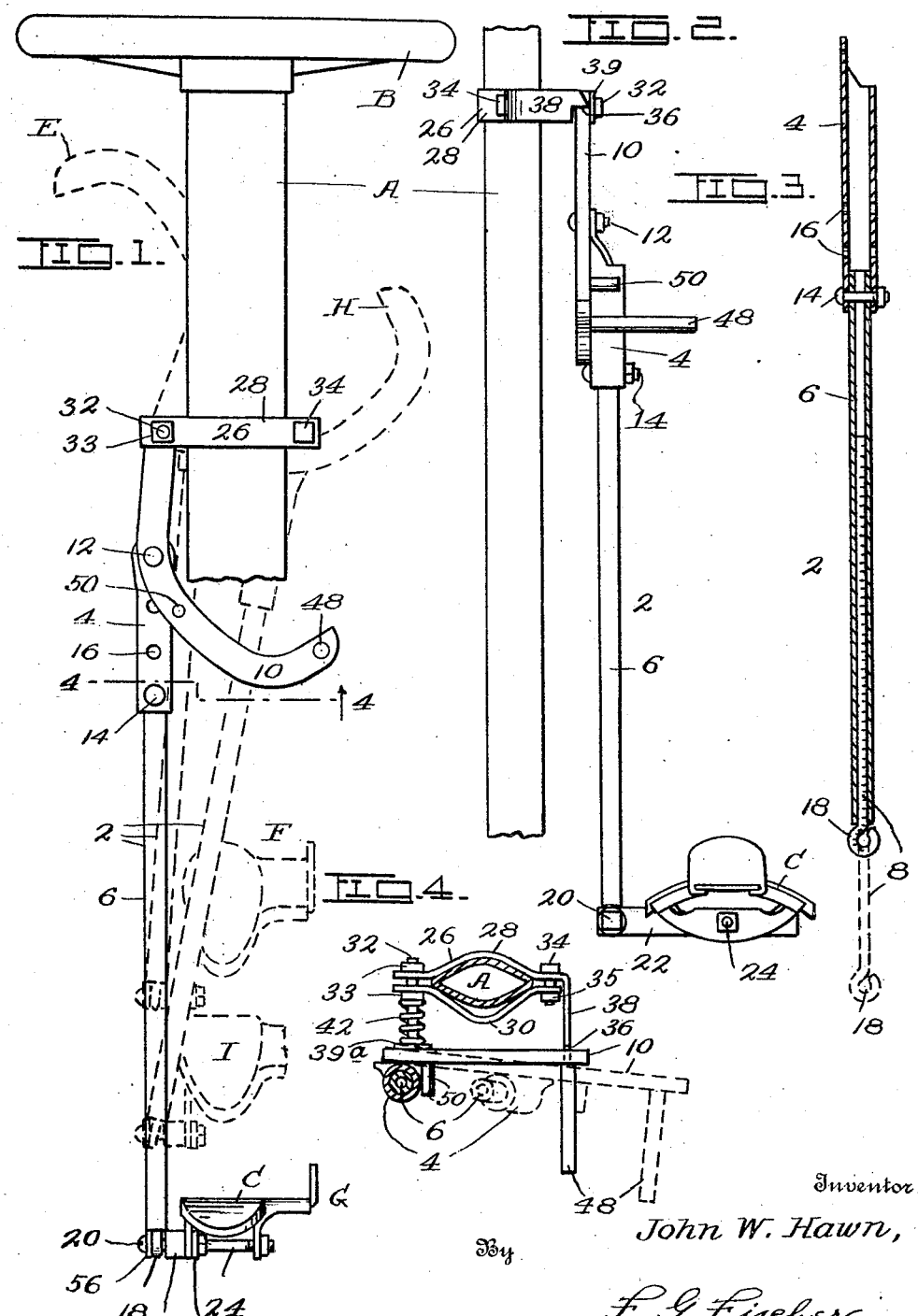
Inventor:
John W. Hawn,
By F. G. Fischer,
Attorney.
Witness:
Fred G. Fischer.

Patented May 25, 1926.

1,585,855

UNITED STATES PATENT OFFICE.

JOHN W. HAWN, OF KANSAS CITY, MISSOURI.

PEDAL-CONTROL MECHANISM.

Application filed December 18, 1925. Serial No. 76,265.

In operating the clutch pedal of the Ford car, whereby shifting to neutral position, or high or low speed is effected, it is often desirable to be able to hold said pedal in the low speed position without retaining the foot upon said pedal. It is also desirable at times to be able to shift said pedal from the low speed position to neutral without danger of inadvertently shifting directly from the low speed to the high speed position, which often occurs, especially with an inexperienced driver, due to the difficulty of quickly and accurately determining when said pedal has reached neutral position.

It is the object of the present invention to provide a simple and inexpensive mechanism whereby said clutch pedal may be quickly and positively adjusted to any of the foregoing positions, and in order that said invention may be fully understood, reference will now be had to the accompanying drawing, in which:

Fig. 1 is a fragmentary front elevation of the steering post and the clutch pedal, with my mechanism connected thereto.

Fig. 2 is a broken side elevation of the parts disclosed by Fig. 1, with the steering wheel removed.

Fig. 3 is a longitudinal section of a telescopic connecting rod employed in carrying out the invention.

Fig. 4 is an inverted cross section on line 4—4 of Fig. 1, with the steering wheel removed and the lever of my mechanism adjusted to neutral position, in dotted lines.

Referring now in detail to the different parts, A designates the steering post, B the steering wheel, and C the clutch pedal whereby shifting to neutral position, or high or low speed, or gear, is effected. The foregoing parts are of the usual construction and the pedal C is normally held, and after being depressed, is automatically returned to high speed position.

Referring now more particularly to the parts constituting my invention, 2 in general designates a connecting rod which consists of a sleeve 4, a tube 6 and a rod 8.

The sleeve 4 is pivotally connected at its upper end to a lever 10 by suitable means such as a bolt 12. The upper end of the tube 6 extends into the sleeve 4 and is adjustably connected thereto by suitable means such as a bolt 14, which may be placed through any of the openings 16 in the sleeve 4 for the purpose of lengthening or shortening the connecting rod 2. The rod 8 telescopes freely in the tube 6 and is provided at its lower end with an eye 18 for the passage of a bolt or pivot 20, whereby the rod 8 is connected to the forward end of an arm 22, firmly secured to the pedal C by a bolt 24.

26 designates a bracket consisting of front and rear plates 28 and 30 bent to fit against the front and rear sides of the steering post A to which they are firmly clamped by bolts 32 and 34 and nuts 33 and 35 threaded upon said bolts. As shown more clearly by Fig. 4, the bolt 32 extends rearwardly of the bracket 26 in order that the lever 10, which is fulcrumed upon the rear portion of the bolt 32, may be freely adjusted to the three positions shown by full and dotted lines, Figs. 1 and 2, without striking the rear plate 30.

In addition to the lever 10 being fulcrumed upon the bolt 32, it is also free to swing laterally as shown by dotted lines, Fig. 4, to clear a shoulder 36 on the rear terminal of an extension 38 formed on one end of the front bracket plate 28. In order to permit of lateral movement of the lever 10, it is loosely mounted upon the bolt 32 and yieldably held against a washer 39 by means of a coil spring 42 embracing the bolt 32 and interposed between the nut 33 and a washer 39ª bearing against the front side of the lever 10.

The lever 10 is provided at its free end with a rearwardly extending handle 48 and at its intermediate portion adjacent to the bolt 12 with a stop 50, whereby its downward movement is limited as said stop 50 contacts the sleeve 4 of the connecting rod 2.

In practice, when the lever 10 is adjusted to its uppermost position as indicated by dotted lines E, the pedal C may be adjusted in the usual manner from high speed to neutral or low speed positions by the driver's foot, and when released is free to swing upwardly to the high speed, or normal position indicated by the dotted lines F. The normal operation of the pedal C, just stated, is effected without hindrance from my mechanism, as the rod 8 slides freely outwardly and inwardly within the tube 6 as said pedal C is either depressed or permitted to swing up to normal position. However, should it be desirable to adjust and hold the pedal C in the low gear position indicated by full lines G, it may be depressed either with the foot or by swinging the lever 10 downwardly to the full line position, Figs. 1 and 2. As the lever 10 moves downwardly it forces the connecting rod 2 downwardly and causes the lower end of the tube 6 to press against washers 56 on the bolt 20 and thus hold the pedal C in a depressed position. The lever 10 is prevented from being inadvertently pushed upwardly by the pedal C through the intermediacy of the connecting rod 2, due to the fact that when said lever 10 is pushed downwardly to its lowermost position, the bolt or pivot 12 passes a straight line drawn through the center of the bolt 32 and the lower end of the rod 8, in which position it remains until released by hand.

Should the driver desire to quickly and accurately adjust the pedal C from either high or low gear positions to neutral, indicated by the dotted lines I, this may be accomplished by adjusting the lever 10 against the underside of shoulder 36, where it is held by the upward pressure of the pedal C against the connecting rod 2. When the lever 10 is adjusted to the neutral position indicated by dotted lines H, the car may, if desired, be driven in low gear by forcing the pedal C down to its lowermost position with the foot, which operation may be performed without changing the position of the lever 10 or any portion of the connecting rod 2, excepting the rod 8, which latter slides outwardly far enough to permit said pedal C to be depressed as stated.

From the foregoing description, taken in connection with the drawing, it is apparent that I have provided a pedal controlling mechanism which may be installed within convenient reach of the driver without the necessity of drilling holes or the employment of special tools, and while I have shown and described the preferred form of my invention I reserve the right to all such modifications thereof as properly fall within the spirit and scope of the invention as claimed.

Having thus described my invention, what I claim and desire to secure by Letters Patent, is:

1. In combination with the steering post and gear shift pedal of a motor vehicle, a telescopic rod operably connected to said pedal, a lever for adjusting said rod to effect adjustment of said pedal to different positions, and supporting means for said lever mounted upon the steering post.

2. In combination with the steering post and gear shift pedal of a motor vehicle, a telescopic rod operably connected to said pedal, a lever for adjusting said rod to effect adjustment of said pedal to different positions, supporting means for said lever mounted upon the steering post, and a shoulder on said supporting means whereby the lever may be stopped in neutral position.

3. In combination with the steering post and gear shift pedal of a motor vehicle, a bracket secured to the steering post and provided with a stop, a bolt employed in securing said bracket to the steering post, a lever fulcrumed upon said bolt and also free to move laterally thereon to engage and disengage said stop, and a connecting rod connected to the pedal and said lever and whereby the latter may effect adjustment of the former to different positions.

4. A mechanism of the character described consisting of a bracket, a lever operably connected to said bracket, a sleeve pivotally connected to said lever, a tube connected to said sleeve, and a rod slidably mounted in said tube.

In testimony whereof I affix my signature.

JOHN W. HAWN.